(12) United States Patent
Vaidyanathan et al.

(10) Patent No.: US 9,298,006 B2
(45) Date of Patent: Mar. 29, 2016

(54) LAYERED LIGHT FIELD RECONSTRUCTION FOR DEFOCUS BLUR

(71) Applicant: Intel Corporation, Santa Clara, CA (US)

(72) Inventors: Karthik Vaidyanathan, Berkeley, CA (US); Marco Salvi, San Francisco, CA (US); Carl Jacob Munkberg, Malmo (SE); Franz Petrik Clarberg, Lund (SE)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 14/156,722

(22) Filed: Jan. 16, 2014

(65) Prior Publication Data

US 2014/0204111 A1    Jul. 24, 2014

Related U.S. Application Data

(60) Provisional application No. 61/754,018, filed on Jan. 18, 2013.

(51) Int. Cl.
| | |
|---|---|
| *G06T 11/00* | (2006.01) |
| *G06T 5/00* | (2006.01) |
| *G06K 9/40* | (2006.01) |
| *G06K 9/36* | (2006.01) |
| *G02B 27/00* | (2006.01) |
| *G06T 15/50* | (2011.01) |

(52) U.S. Cl.
CPC ........... *G02B 27/0075* (2013.01); *G06T 5/002* (2013.01); *G06T 11/00* (2013.01); *G06T 15/503* (2013.01); *G06T 2200/21* (2013.01)

(58) Field of Classification Search
USPC ............... 345/419–423, 426, 428, 581, 592, 345/629–630, 653; 382/163, 254, 260, 264, 382/274
See application file for complete search history.

(56) References Cited

U.S. PATENT DOCUMENTS

| | | | | |
|---|---|---|---|---|
| 2004/0114794 | A1* | 6/2004 | Vlasic et al. ................... | 382/154 |
| 2009/0244300 | A1* | 10/2009 | Levin et al. .................. | 348/208.5 |
| 2012/0206471 | A1* | 8/2012 | Sarnoff et al. ................ | 345/581 |
| 2014/0125894 | A1* | 5/2014 | Ranieri et al. .................. | 349/15 |
| 2014/0176540 | A1* | 6/2014 | Tosic et al. ..................... | 345/420 |

OTHER PUBLICATIONS

Belcour, L., et al., "5D Covariance Tracing for Efficient Defocus and Motion Blur," ACM Transactions on Graphics, (2013) 32 (3) pp. 31:1-31:18 (19 pages).
Chai, J.X., et al, "Plenoptic Sampling," Proceedings of SIGGRAPH 2000, (Jul. 2000), pp. 307-318 (12 pages).
Durand, F., et al., "A Frequency Analysis of Light Transport," ACM Transactions on Graphics, (2005) 24(3), pp. 1115-1126 (12 pages).

(Continued)

*Primary Examiner* — Wesner Sajous
(74) *Attorney, Agent, or Firm* — Trop Pruner & Hu, P.C.

(57) ABSTRACT

An algorithm may reconstruct defocus blur from a sparsely sampled light field. Light field samples are generated, using stochastic rasterization or ray tracing as examples. Then the samples are partitioned into depth layers. These depth layers are filtered independently and then combined together, taking into account inter-layer visibility. Since each layer corresponds to a smaller depth range, it results in more effective reconstruction filters than previous approaches.

29 Claims, 4 Drawing Sheets

(56) References Cited

OTHER PUBLICATIONS

Egan, K., et al., "Practical Filtering for Efficient Ray-Traced Directional Occlusion," ACM Transactions on Graphics, (2011) 30 (6), pp. 180:1-180:10 (10 pages).
Egan, K., et al., "Frequency Analysis and Sheared Filtering for Shadow Light Fields of Complex Occluders," ACM Transactions on Graphics (2011), 30(2), pp. 9:1-9:13 (13 pages).
Egan, K., et al., "Frequency Analysis and Sheared Reconstruction for Rendering Motion Blur," ACM Transactions on Graphics (2009), 28(3), p. 93:1-93:13 (13 pages).
Lanman, D., et al., "Shield Fields: Modeling and Capturing 3D Occluders," ACM Transactions on Graphics, (2008), 27(5), pp. 131:1-131:10 (10 pages).
Lee, S., et al. "Real-Time Lens Blur Effects and Focus Control," ACM Transactions on Graphics, (2008), 29(4) pp. 65:1-65:7 (7 pages).
Lehtinen, J., et al., "Reconstructing the Indirect Light Field for Global Illumination," ACM Transactions on Graphics (2012), 31(4), 51:1-51:10 (10 pages).
Lehtinen, J., et al., "Temporal Light Field Reconstruction for Rendering Distribution Effects," ACM Transactions on Graphics (2011), 30(4), pp. 55:1-55:12 (12 pages).
Lei, K., et al., "Approximate Depth of Field Effects using Few Samples per Pixel," Symposium on Interactive 3D Graphics and Games (2013), pp. 119-128 (10 pages).
Mehta, S.U., et al., "Axis-Filtering for Interactive Sampled Soft Shadows," ACM Transactions on Graphics, (2012), 31(6) pp. 163:1-163:10 (10 pages).
Ramamoorthi, R., "A Theory of Monte Carlo Visibility Sampling," ACM Transactions on Graphics (2012), 31(5), pp. 121:1-121:16 (16 pages).
Shirley, P., et al., "A Local Image Reconstruction Algorithm for Stochastic Rendering," Symposium on Interactive 3D Graphics and Games, (2011), pp. 9-14 (5 pages).
Soler, C., et al., "Fourier Depth of Field, " ACM Transactions on Graphics, (2009), 28(2) pp. 18:1-18:12 (18 pages).
Yu, X., et al., "Real-Time Depth of Field Rendering via Dynamic Light Field Generation and Filtering," Computer Graphics Forum (Proceedings of Pacific Graphics 2011) (2011), 29(7), pp. 2099-2107 (9 pages).

* cited by examiner

LAYERED LIGHT FIELD RECONSTRUCTION FOR DEFOCUS BLUR

CROSS-REFERENCE TO RELATED APPLICATION

This non-provisional application claims priority to provisional application Ser. No. 61/754,018 filed Jan. 18, 2013, hereby expressly incorporated by reference herein.

BACKGROUND

Defocus blur is a widely used camera lens effect in computer generated imagery. in movies and games today. Offline renderers typically simulate defocus by sampling numerous positions on the lens using distribution ray tracing, stochastic rasterization or multi-layer rendering. Real-time renderers approximate the effect with samples from a traditional two dimensional (2D) rasterizer, resulting in objectionable visual artifacts but fast performance. Although significant research progress has been made in the area of real-time stochastic rendering and ray tracing, the large number of samples required to produce noise free defocus blur images remains a key challenge in making these higher-quality rendering approaches practical for real-time.

Recent advancements in light field reconstruction techniques have made it possible to reproduce low-noise defocus blur images with a small number of samples; however, the computational overhead of the reconstruction algorithms preclude interactive performance. Reconstruction techniques based on frequency analysis and sheared filtering are particularly promising. These techniques suppress noise by using local derivatives of the light field to derive sheared reconstruction filters that tightly bound the frequency spectrum of the light field. Unfortunately, these filters result in noisy reconstruction when the local derivatives vary significantly over a pixel, such as when in-focus and out-of-focus objects contribute to the same pixel. Moreover, variations in the light field derivatives can lead to different filtering parameters for each pixel. This prevents efficient separable filter implementations and greatly impacts performance.

BRIEF DESCRIPTION OF THE DRAWINGS

Some embodiments are described with respect to the following figures.

DETAILED DESCRIPTION

Figure 1:
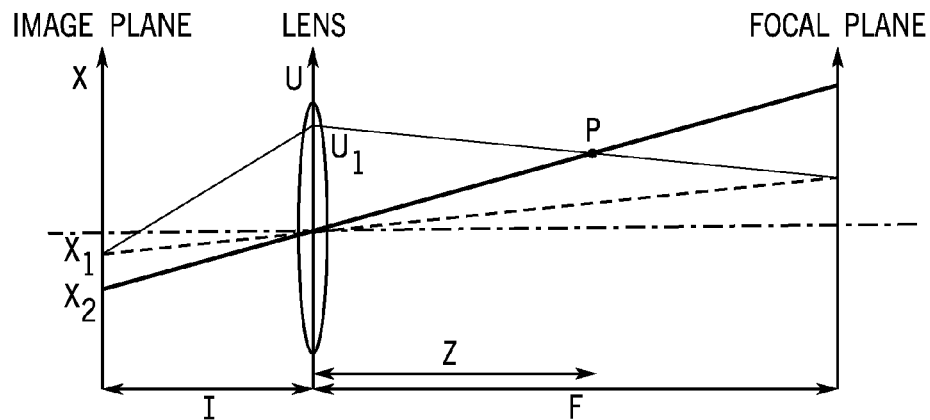
FIG. 1 is a depiction of a parameterized light field using two parallel planes.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electric (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media and flash memory devices.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

An algorithm may reconstruct defocus blur from a sparsely sampled light field. Light field samples are generated, using stochastic rasterization or ray tracing as examples. Then the samples are partitioned into depth layers. These depth layers are filtered independently and then combined together, taking into account inter-layer visibility. Since each layer corresponds to a smaller depth range, it results in more effective reconstruction filters than previous approaches.

An approximation of the layer opacity is built based on the samples and the approximation is filtered to perform a high-quality compositing of the depth layers. A separable formulation of the reconstruction filters may achieve real time performance in some embodiments.

Previous reconstruction methods based on sheared filters are ineffective in regions of the image with complex occlusion. Therefore, these techniques require a large number of samples in these regions resulting in significantly higher rendering cost. This algorithm can handle such scenarios using a technique that partitions the samples into depth layers, filters these layers independently and then composites them.

Previous approaches perform frequency analysis in order to drive adaptive sampling of difficult regions. These approaches can reach a high image quality, but have unpredictable performance. They also usually rely on ray tracing, as adaptive sampling is difficult in rasterization pipelines. Some embodiments include a separable formulation of the sheared reconstruction filters that achieves real time performance with an average reconstruction time that is faster than published techniques for high-quality depth of field reconstruction using geometric approaches.

A two-dimensional (2D) light field is parameterized using two parallel planes: an image plane with coordinate x and a lens coordinate u, one unit away, as shown in FIG. 1. This 2D analysis CaO be easily extended to 4D where (x, y) are coordinates in the image plane and (u, v) are coordinates on the lens.

Depending on the input scene, the point P can lie in a certain depth range. Based on this setup, a sheared filter $w_{shear}$ for defocus blur can be derived and can be expressed as a product of two 1D filters:

$$w_{shear}(x, u) = w(x; \sigma_x) w\left(u + \frac{x}{c_{avg}}; \sigma_u\right),$$

with $c_{avg}$ computed using the minimum and maximum circle of confusion radius corresponding to the maximum and minimum depth in a depth range:

$$c_{avg} = \frac{2 c_{min} c_{max}}{c_{min} + c_{max}} c(z) = \frac{z - F}{zF}$$

Gaussian filters may be used for reconstruction and therefore w represents a Gaussian function.

The filter $w_{shear}$ can also be expressed as a product of a Gaussian filter that is purely a function in u and a sheared screen space Gaussian filter in x. This modified filter can be extended to an efficient 4D filter which can be evaluated as a pre-integration step that is computed once for each layer, followed by a separable 2D filter in x and y.

To find such a suitable separable formulation, $w_{shear}(x, u)$ may be expressed as a 2D Elliptical Gaussian filter of the form $$w_{shear}(x, u) = \frac{1}{2\pi |M|} e^{-\frac{1}{2} x (M^T M)^{-1} x^T},$$

where x is the vector (x, u) and $$M = \begin{bmatrix} \sigma_x & 0 \\ 0 & \sigma_u \end{bmatrix} \begin{bmatrix} 1 & -\frac{1}{c_{avg}} \\ 0 & 1 \end{bmatrix}.$$

$$w(u; \sigma_u) = \frac{1}{\sqrt{2\pi}\sigma_u} e^{\frac{-u^2}{2\sigma_u^2}}.$$

To reformulate the filter as an aperture filter that is independent of x, times a sheared screen space filter, another warping matrix N is searched for:

$$N = \begin{bmatrix} \sigma'_x & 0 \\ 0 & \sigma'_u \end{bmatrix} \begin{bmatrix} 1 & 0 \\ -\eta & 1 \end{bmatrix}.$$

To obtain the same filter, enforce:

$$N^T N = M^T M.$$

Solving this equation obtains:

$$\sigma'_x = \frac{\sigma_x \sigma_u}{\gamma}, \sigma'_u = \gamma, \text{ and } \eta = \frac{\sigma_x^2}{c_{avg} \gamma^2}, \text{ where } \gamma = \sqrt{\sigma_u^2 + \frac{\sigma_x^2}{c_{avg}^2}}.$$

A reconstruction filter can then be expressed as:

$$w_{shear}(x, u) = w(x; \sigma_x) w\left(u + \frac{x}{c_{avg}}; \sigma_u\right)$$
$$= \underbrace{w(x + \eta u; \sigma'_x)}_{w_x} \underbrace{w(u; \sigma'_u)}_{w_u}$$

This means that the exact same elliptical Gaussian filter can be obtained by a modified scaling, followed by a shear in x per unit u. Thus, a filter is derived consisting of an aperture filter that depends only on u, followed by a sheared screen space filter in x. This enables a very efficient filter implementation in some embodiments. However, in some embodiments axis-aligned filters may be used.

The reconstructed image is obtained by applying the reconstruction filter to the input light field samples, described by the following equation, ∫∫l(x',u)w(x'−x,u)dudx'.

Since the reconstruction filter is separable in x and u, this equation can be expressed as an inner integral over u, followed by a convolution in screen space. Using the transformed filter described in the previous section, results in:

$$e(x) \approx \int\int l(x', u) w_{shear}(x' - x, u) du dx' \qquad (1)$$
$$= \int\int l(x', u) w_x((x' - x) + \eta u) w_u(u) du dx'$$
$$[\text{Let } q = x' + \eta u, dq = dx']$$
$$= \int \underbrace{\left[\int w_u(u) l(q - \eta u, u) du\right]}_{l_l(q)} w_x(q - x) dq$$
$$= \int l_l(q) w_x(x - q) d_q$$
$$= (l_l \times w_x)(x), \text{ since } w_x \text{ is symmetric}$$

where e(x) represents the reconstructed irradiance at a point x on the image.

Given a set of radiance samples, the outer integral is a convolution in screen space with the filter $w_x$, and the inner integral represents a pre-integration over the parameterized line (q−ηu, u). Evaluating the inner integral at a pixel x would normally require an expensive search to gather samples along the line u=0. This search may be avoided by projecting each sample along the line to u=0 and accumulating its weighted radiance at the target pixel q, thereby transforming the gather operation into a scatter operation.

Figure 2:
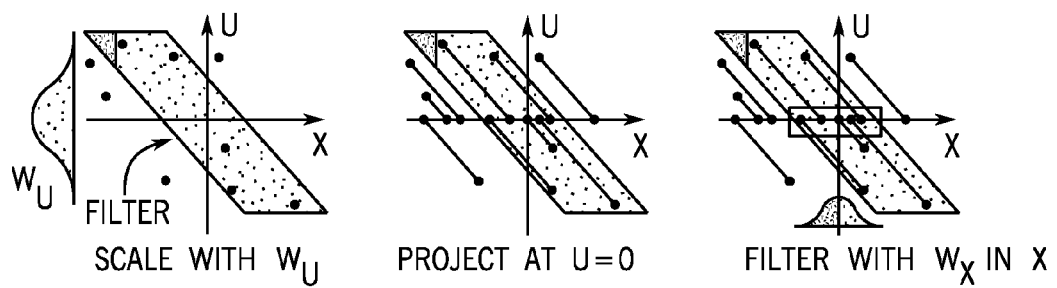
FIG. 2 is a filtering formulation described in (x, u) space according to one embodiment.

As shown in FIG. 2, an efficient implementation of this filter is given by the following steps: (1) multiply each radiance sample $l(x_i, u_i)$ with $w_u(u_i)$ (left depiction), (2) for all samples $l(x_i, u_i)$ in the current depth layer, accumulate $l(x_i, u_i) w_u(u_i)$ at the pixel $q=x_i+\eta u\_i$ (middle depiction) and (3) for each pixel, apply the screen space filter $w_x(x)$ over the accumulated sums (right depiction).

Evaluation of the inner integral (first and second steps) can be performed once for each layer for all samples (e.g., in a tile), while the third step is unique for each pixel within each layer. This is in contrast to a naïve filter implementation, where a sheared filter kernel in (x, u) is repeated for each pixel in all layers. This efficient filter formulation may improve performance.

The accumulation of weighted samples in step (2) may introduce very minor differences as, in practice, the number of bins (pixels) is finite and thus some quantization is introduced. This effect may be minimized by bilinearly splatting each sample to the four nearest bins.

When there is a large difference between the minimum and maximum depth inside a screen space region, the resulting frequency bounds of the sheared filter can become very large. This leads to a narrow reconstruction filter in the primal domain and limited noise reduction.

If the light field samples are partitioned into disjoint depth layers, one can derive a more effective filter for each layer. The filter width is closely related to $c(z)$, which varies monotonically with depth for $z>0$, i.e., in front of the lens.

However different layers may occlude each other and the radiance corresponding to a layer may or may not contribute to the overall radiance. Therefore, a way of compositing the filtered layers together, that takes occlusion between layers into account is needed.

The reconstruction filters may be used to compute the irradiance estimate and additionally an average opacity for each layer. Then the average opacity may be used to composite the irradiance estimate values from front to back using alpha blending.

$$e(x) \approx e_0(x) + \sum_{j=1}^{N} e_j(x) \prod_{k=0}^{j-1} (1 - \overline{\alpha}_k(x)) \quad (2)$$

where $e_j$ represents the irradiance estimate for a layer j and $\overline{\alpha}_k$ represents the average opacity for layer k.

The average opacity may be reconstructed by applying the reconstruction filter to the opacity term $\alpha$. Following equation 1, the reconstructed opacity $\overline{\alpha}_j(x)$ integrated over the lens for a pixel x in layer j can be written as:

$$\overline{\alpha}_j(x) \approx \int \underbrace{\left[ \int w_u(u) \alpha_j(q - \eta u, u) du \right]}_{I\alpha_j(q)} w_x(x - q) dq, \quad (3)$$

where we have used the substitution $q = x + \eta u$. Note that $\eta$ us a layer-specific value.

In practice, $\overline{\alpha}_j(x)$ and the irradiance $e_j(x)$ for a layer j are evaluated according to the pseudo code in Algorithm 1 below. This includes a pre-integration step that evaluates the inner integrals in Equations 1 and 3, followed by a 2D screen space filter. The pseudo code describes the efficient filter formulation discussed previously, which includes a pre--integration step, followed by a 2D screen space filter. The filter is shown applied to (x,u) for clarity, but it is trivial to extend it to the full 4D light field.

---

Algorithm 1. Filter at pixel x for layer j.

---

```
for all light field samples (x_i, u_i, z_i) do         Pre-integration
    q = x_i + η u_i
    if z_i in depth range of layer j then
        I_α (q) + w_u (u_i)
        I_e (q) + l(x_i,u_i)w_u (u_i)
        n(q) + w_u (u_i)                               Normalization factor
    else
        if z_i is in layer k> j then                   Hole in current layer
            n(q) + w_u (u_i)
        end if
    end if
end for
for all pixels q_i in kernel of w_x do                 Screen space filter
    I_α(x)+ = I_α(q_i)w_x (x - q_i)
    I_e(x)+ = I_e(q_i)w_x (x - q_i)
    n (x)+ = n(q_i)w_x (x - q_i)
end for
```

$$\overline{a}_j(x) = \frac{I_\alpha(x)}{\overline{n}(x)},$$                      Normalization step $$e_j(x) = \frac{\overline{I}_e(x)}{\overline{n}(x)}$$

---

Figure 3:
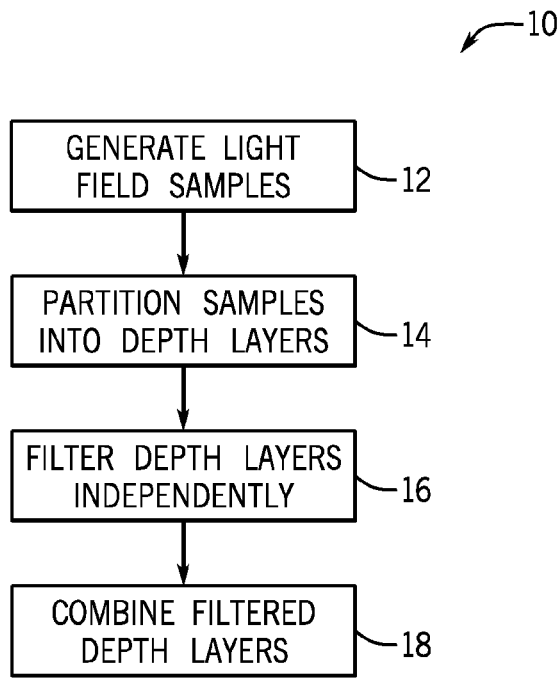
FIG. 3 is a flow chart for one embodiment.

According to one embodiment, a sequence 10, shown in FIG. 3, may be implemented in software, firmware and/or hardware. In software and firmware embodiments it may be implemented by computer executed instructions stored in one or more non-transitory computer readable media such as magnetic, optical or semiconductor storage.

The sequence 10 begins by generating light field samples as indicated at block 12. Then the samples are partitioned into depth layers as indicated in block 14. Next the depth layers are filtered independently as indicated in block 16. Finally the filtered depth layers are combined as indicated in block 18.

The depth distribution of samples in the entire scene can span a wide range of values, requiring a large number of partitions. To address this problem and to facilitate parallel implementations of our method, the samples may be divided into small tiles (say 32×32 pixels) and each tile is processed independently. In other embodiments, tiles of different sizes, a hierarchy of tiles, or no tiles at all, are used.

In one embodiment, the depth partitions are chosen so that the worst case filter energy for each partition are approximately the same. In this case, the partitions are smallest around the focal plane and grow in size as one moves away. In other embodiments, the partitions are chosen adaptively based on the samples, or using a fixed partitioning optimized for hardware implementation.

The reconstruction algorithm for defocus blur significantly improves the reconstruction quality and performance of sheared reconstruction filters in some cases. It handles regions with complex occlusion by partitioning the light field samples into depth layers. Since each layer has a reduced depth range, the corresponding spectral bounds of the light field become narrower, resulting in more effective reconstruction filters.

However, partitioning the light field into depth layers presents a challenge since different layers can occlude each other in complex ways. In order to address inter-layer occlusion, filters reconstruct the average radiance and average visibility for each layer. These estimates are then used to composite the partitions from front to back and reconstruct the final pixel color.

Unlike previous work, where a unique filter is evaluated per pixel, the disclosed technique divides the domain into tiles and use a small number of fixed sheared filters within each tile. By deriving a separable formulation for these filters, filtering costs can be amortized over the large number of pixels in a tile, enabling real time performance.

Figure 4:
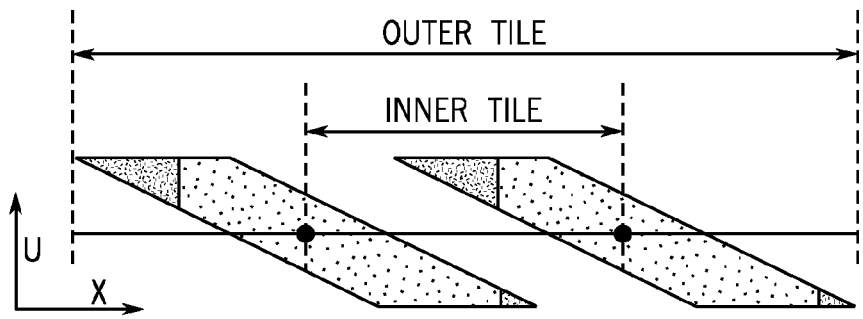
FIG. 4 is a depiction of an inner tile and the filter footprint at corners of the inner tile according to one embodiment.

Because of the use of a sheared reconstruction filter, samples from outside a tile can contribute to the filtered result inside a tile. A border may define an outer tile, which includes additional samples from neighboring inner tiles required for analysis and filtering, as shown in FIG. 4.

An outer tile size of 64×64 pixels provides an additional ring of 16 pixels around the inner tile. Therefore, in one example, the maximum filter width that can be supported is 32×32 pixels. Larger tile sizes may be used in other embodiments.

For a graphics processing unit (GPU) implementation, shared local memory may store the intermediate results from the filtering steps for faster access. This also leverages local integer atomic add operations on the GPU to implement the pre-integration step, where samples are projected to the center of the lens and accumulated on a 2D grid.

Figure 5:
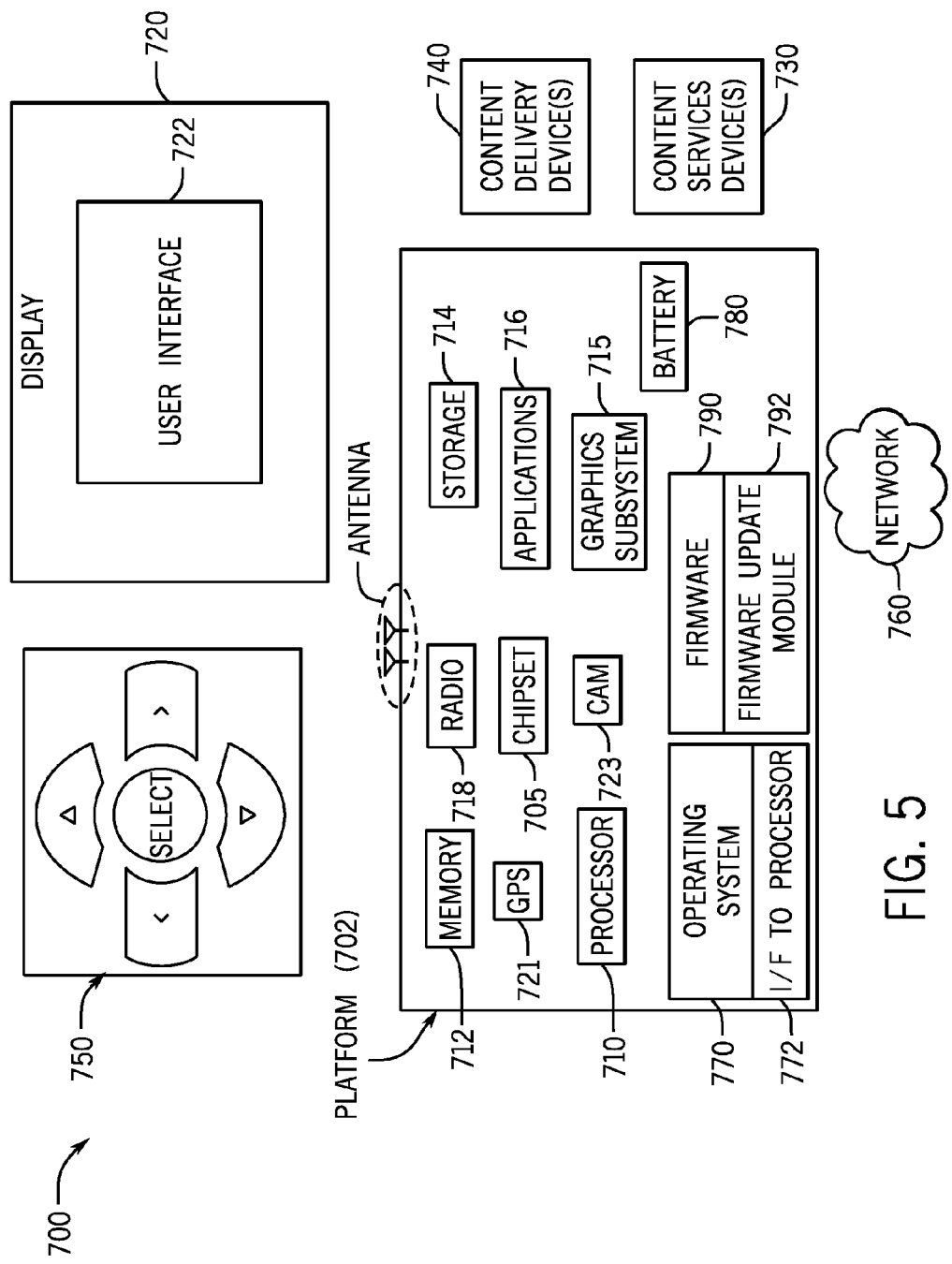
FIG. 5 is an illustrative diagram of an example system.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 3, together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the disclosure.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions or sounds.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
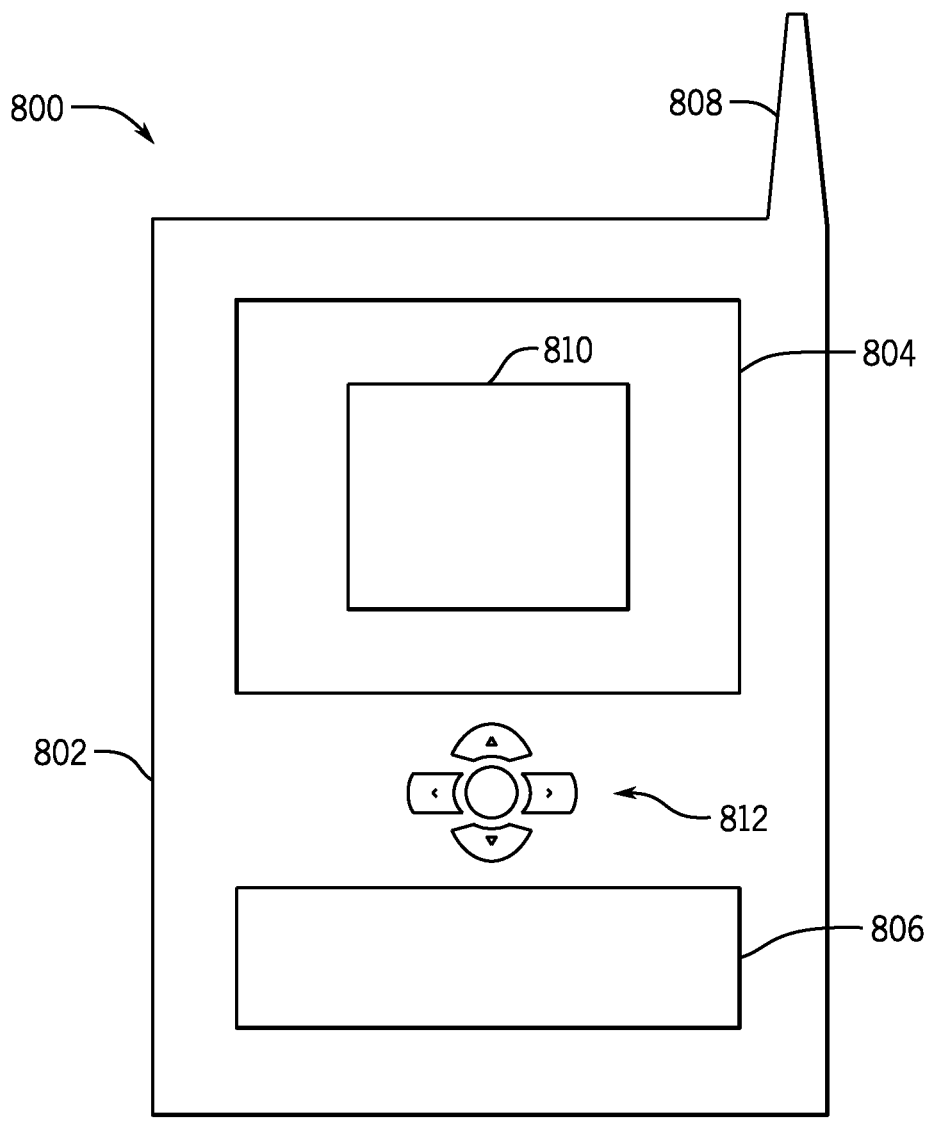
FIG. 6 illustrates an example device, all arranged in accordance with at least some implementations of the present disclosure.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 3 in software and/or firmware embodiments.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A computer-implemented method for performing defocus blur, comprising:
   adaptively partitioning light field information into a plurality of depth layers;
   filtering each of the depth layers independently by reconstructing an average radiance and average opacity for each layer using a hardware electronic filter; and
   compositing the filtered layers to simulate defocus blur in an image.

2. The method of claim 1 including reconstructing a fixed pixel color by compositing partitions from front to back.

3. The method of claim 1, wherein filtering each of the depth layers comprises employing a sheared filter.

4. The method of claim 1, wherein filtering each of the depth layers comprises employing an axis-aligned filter.

5. The method of claim 3 including using a plurality of fixed sheared filters within each of a plurality of tiles.

6. The method of claim 1 including reducing visibility computations over four dimensional depth slices to an approximate alpha blending of two dimensional slices by pre-integrating over a lens in each slice.

7. The method of claim 1 including estimating opacity within each layer based on a sparse set of light field samples.

8. The method of claim 7 including reconstructing integrated opacity over a lens for each layer using a layer specific sheared filter.

9. At least one non-transitory machine-readable medium comprising a plurality of instructions that in response to being executed on a computing device, cause the computing device to carry out a method comprising:
   adaptively partitioning light field information into a plurality of depth layers;
   filtering each of the depth layers independently by reconstructing an average radiance and average opacity for each layer using a hardware electronic filter; and
   compositing the filtered layers to simulate defocus blur in an image.

10. The media of claim 9, wherein filtering includes reconstructing an average radiance and average visibility for each layer.

11. The media of claim 10, said method including reconstructing a fixed pixel color by compositing partitions from front to back.

12. The media of claim 9, wherein filtering each of the depth layers comprises employing a sheared filter.

13. The media of claim 9, wherein filtering each of the depth layers comprises employing an axis-aligned filter.

14. The media of claim 12, said method including using a plurality of fixed sheared filters within each of a plurality of tiles.

15. The media of claim 9, said method including reducing visibility computations over four dimensional depth slices to an approximate alpha blending of two dimensional slices by pre-integrating over a lens in each slice.

16. The media of claim 9, said method including estimating opacity within each layer based on a sparse set of light field samples.

17. The media of claim 16, said method including reconstructing integrated opacity over a lens for each layer using a layer specific sheared filter.

18. An apparatus comprising:
   a processor to adaptively partition light field information into a plurality of depth layers, electronically filter each of the depth layers independently by reconstructing an average radiance and average opacity for each layer, and composite the filtered layers; and
   a storage coupled to said processor.

19. The apparatus of claim 18, said processor to reconstruct an average radiance and average visibility for each layer.

20. The apparatus of claim 19, said processor to reconstruct a fixed pixel color by compositing partitions from front to back.

21. The apparatus of claim 18, said processor to employ a sheared filter.

22. The apparatus of claim 18, said processor to employ an axis-aligned filter.

23. The apparatus of claim 21, said processor to use a plurality of fixed sheared filters within each of a plurality of tiles.

24. The apparatus of claim 18, said processor to reduce visibility computations over four dimensional depth slices to an approximate alpha blending of two dimensional slices by pre-integrating over a lens in each slice.

25. The apparatus of claim 18, said processor to estimate opacity within each layer based on a sparse set of light field samples.

26. The apparatus of claim 25, said processor to reconstruct integrated opacity over a lens for each layer using a layer specified sheared filter.

27. The apparatus of claim 18 including a display communicatively coupled to the processor.

28. The apparatus of claim 18 a battery coupled to the processor.

29. The apparatus of claim 18 including firmware and a module to update said firmware.

* * * * *